United States Patent
Meng et al.

(10) Patent No.: US 11,471,870 B2
(45) Date of Patent: Oct. 18, 2022

(54) DEVICE AND METHOD FOR CONTINUOUSLY PRODUCING CATALYSTS BASED ON LOW-TEMPERATURE COPRECIPITATION

(71) Applicant: Zhengzhou University, Zhengzhou (CN)

(72) Inventors: Bo Meng, Zhengzhou (CN); Yifan Han, Zhengzhou (CN)

(73) Assignee: Zhengzhou University, Zhengzhou (CN)

( * ) Notice: Subject to any disclaimer, the term of this patent is extended or adjusted under 35 U.S.C. 154(b) by 0 days.

(21) Appl. No.: 17/119,315

(22) Filed: Dec. 11, 2020

(65) Prior Publication Data

US 2021/0316294 A1 Oct. 14, 2021

(30) Foreign Application Priority Data

Apr. 14, 2020 (CN) .......................... 202010292021.0

(51) Int. Cl.
*B01J 4/02* (2006.01)
*B01J 4/04* (2006.01)
(Continued)

(52) U.S. Cl.
CPC ............... *B01J 37/031* (2013.01); *B01J 4/02* (2013.01); *B01J 19/0013* (2013.01); *B01J 19/02* (2013.01);
(Continued)

(58) Field of Classification Search
CPC ....... B01J 4/00; B01J 4/02; B01J 19/00; B01J 19/0006; B01J 19/0013; B01J 19/02; B01J 19/18; B01J 19/1862; B01J 23/00; B01J 23/70; B01J 23/76; B01J 23/84; B01J 23/889; B01J 23/8892; B01J 35/00; B01J 35/02; B01J 35/08; B01J 2219/00;
(Continued)

(56) References Cited

FOREIGN PATENT DOCUMENTS

CN 106540705 A * 3/2017 .............. B01J 23/83

OTHER PUBLICATIONS

Machine translation of CN 106540705 A, which was published on Mar. 9, 2017 (Year: 2017).*

* cited by examiner

*Primary Examiner* — Natasha E Young
(74) *Attorney, Agent, or Firm* — Thomas | Horstemeyer, LLP

(57) ABSTRACT

The present disclosure discloses a device and a method for continuously producing catalysts based on low-temperature coprecipitation. The device mainly includes: a metal salt preparation kettle, a primary reaction kettle, a secondary reaction kettle, a precipitant preparation kettle, a circulating refrigeration system, an automatic control system, a non-aqueous solvent storage tank and a water storage tank. Independent preparation kettles are provided for rapid dissolution of the raw materials, and can be used to prepare the raw materials for the next batch during the reactions that are carried out in the primary and secondary reaction kettles; the circulating refrigeration system refrigerates the primary and secondary reaction kettles, and thus during the reaction, the low-temperature precipitant makes it possible to offset the precipitation reaction heat and the heat caused by the stirring in the primary reaction kettle, and improve the refrigeration efficiency of the primary reaction kettle.

5 Claims, 1 Drawing Sheet

(51) Int. Cl.
*B01J 19/00* (2006.01)
*B01J 19/02* (2006.01)
*B01J 19/18* (2006.01)
*B01J 23/84* (2006.01)
*B01J 35/08* (2006.01)
*B01J 35/02* (2006.01)
*B01J 37/03* (2006.01)
*B01J 37/04* (2006.01)
*B01J 37/10* (2006.01)
*F24H 4/04* (2006.01)

(52) U.S. Cl.
CPC ............ *B01J 19/1862* (2013.01); *B01J 37/04* (2013.01); *B01J 37/10* (2013.01); *F24H 4/04* (2013.01); *B01J 2219/00155* (2013.01); *B01J 2219/00189* (2013.01); *B01J 2219/0286* (2013.01)

(58) Field of Classification Search
CPC .... B01J 2219/00049; B01J 2219/00051; B01J 2219/0015; B01J 2219/00155; B01J 2219/00189; B01J 2219/02; B01J 2219/025; B01J 2219/0277; B01J 2219/0286; F24H 4/00; F24H 4/02; F24H 4/04
See application file for complete search history.

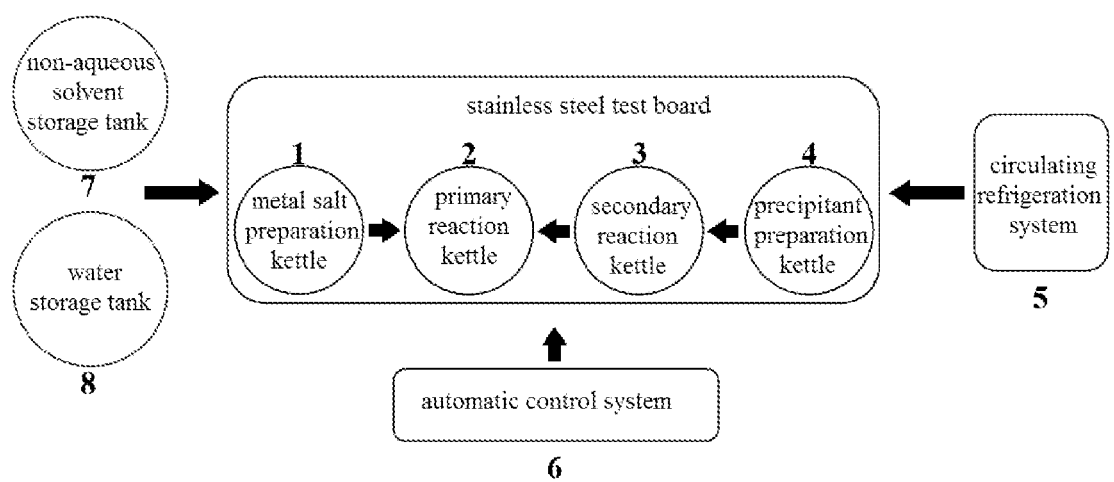

DEVICE AND METHOD FOR CONTINUOUSLY PRODUCING CATALYSTS BASED ON LOW-TEMPERATURE COPRECIPITATION

CROSS REFERENCE TO RELATED APPLICATION

This application claims the priority of Chinese Patent Application No. 202010292021.0, entitled "Device and method for continuously producing catalysts based on low-temperature coprecipitation" filed with the China National Intellectual Property Administration on Apr. 14, 2020, which is incorporated herein by reference in its entirety.

TECHNICAL FIELD

The present disclosure belongs to the technical field of the equipment and process for synthesizing catalysts, and in particular to a device and a method for continuously producing catalysts based on low-temperature coprecipitation.

BACKGROUND

With the development of social economy, catalysts have been used in various fields such as industrial production, energy utilization, biomedicine, and environmental protection. The development of high-performance catalysts and study of large-scale industrial production are of importance for promoting social and technological progress.

The heterogeneous catalytic reaction process mainly comprises three steps: an adsorption of reactants on the surface of a catalyst, an activation and conversion (surface reaction) of the adsorbed reactants and a desorption of products. Therefore, in order to exhibit high catalytic performance, a catalyst should have a high specific surface area and a high surface energy, wherein the high specific surface area make it possible to provide more contact surface with reactants during the reaction process, and the high surface energy make it possible to ensure that the adsorbed reactants can be quickly activated and participate in the subsequent reactions.

The applicant disclosed a method for synthesizing a low-temperature manganese-based composite metal oxide denitration catalyst in CN104001520A, and found that a manganese-based composite metal oxide with a high specific surface area and a high catalytic activity was synthesized by a coprecipitation method at a temperature ranging from −10° C. to 0° C., in which a non-aqueous solvent was used as the mother liquid; it proved that the low-temperature coprecipitation and the use of non-aqueous solvent mother liquid were beneficial to the preparation of catalysts with a high specific surface area and a high performance. However, a device and a method for the continuous industrial production based on low-temperature coprecipitation have not been reported in existing patents.

SUMMARY

The present disclosure is to provide a device for continuously producing catalysts based on low-temperature coprecipitation and a method for using the same. The device is simple for operation and easy to control, so that it is especially suitable for a low-temperature continuous industrial production of catalysts.

The present disclosure provides a device for continuously producing catalysts based on low-temperature coprecipitation, comprising: a metal salt preparation kettle, a primary reaction kettle, a secondary reaction kettle, a precipitant preparation kettle, a circulating refrigeration system, an automatic control system, a non-aqueous solvent storage tank and a water storage tank, wherein:

the automatic control system is configured to control the transfer of a quantitative non-aqueous solvent from the non-aqueous solvent storage tank and quantitative water from the water storage tank to the metal salt preparation kettle respectively, and to control the metal salt preparation kettle in a heating and stirring state after adding a quantitative metal salt to the metal salt preparation kettle;

the automatic control system is configured to control the transfer of a quantitative non-aqueous solvent from the non-aqueous solvent storage tank and a quantitative water from the water storage tank to the precipitant preparation kettle respectively, and to control the precipitant preparation kettle in a heating and stirring state after adding a quantitative precipitant to the precipitant preparation kettle;

the automatic control system is configured to control the transfer of the mixed solution in the metal salt preparation kettle to the primary reaction kettle and the mixed solution in the precipitant preparation kettle to the secondary reaction kettle, to control the circulating refrigeration system to refrigerate the primary reaction kettle and the secondary reaction kettle, and to control the primary reaction kettle and the secondary reaction kettle in a stirring state;

under the condition that the primary reaction kettle and the secondary reaction kettle are refrigerated to the synthesis temperature, the automatic control system is to control the liquid constant flow pump to add the precipitant-containing mixed solution in the secondary reaction kettle into the primary reaction kettle at a constant speed, and after the synthesis, a material is discharged from the discharge port at the lower end of the primary reaction kettle.

In some embodiments, the metal salt preparation kettle is made of stainless steel, with a heat-preservation jacket, wherein the outer part of the jacket is covered with a stainless steel skin and the inner part thereof is filled with a heat-preservation cotton; the metal salt preparation kettle has a heating function and a stirring function; the metal salt preparation kettle is provided with a manual feeding port and an automatic feeding port at its upper end, and a discharging port at its lower end;

the primary reaction kettle is made of stainless steel, with a heat-preservation jacket, wherein the outer part of the jacket is covered with a stainless steel skin and the inner part thereof is filled with a polyurethane for heat preservation; the primary reaction kettle has a refrigerating function and a stirring function; the primary reaction kettle is provided with an automatic feeding port for liquid charging at its upper end, and a discharging port at its lower end;

the secondary reaction kettle is made of stainless steel, with a heat-preservation jacket, wherein the outer part of the jacket is covered with a stainless steel skin and the inner part thereof is filled with a polyurethane for heat preservation; the secondary reaction kettle has a refrigerating function and a stirring function; the secondary reaction kettle is provided with an automatic feeding port for liquid charging at its upper end, and a discharging port for liquid discharging at its lower end;

the precipitant preparation kettle is made of stainless steel, with a heat-preservation jacket, wherein the outer part of the jacket is covered with a stainless steel skin and the inner part thereof is filled with a heat-preservation cotton; the precipitant preparation kettle has a heating function and a stirring function; the precipitant preparation kettle is provided with a manual feeding port and an automatic feeding port at its upper end, and a discharging port at its lower end.

In some embodiments, the circulating refrigeration system is provided with a liquid crystal display touch screen, controlled by a PLC, and equipped with a plurality of low-temperature coolant circulating pumps and stainless-steel liquid storage tanks for storing the coolant specialized for each circulating pump.

In some embodiments, the automatic control system is provided with a graphical human-machine interface, which can realize an automatic control of the operation of the whole device, including an automatic control of buttons for controlling quantitative fluid transferring, stirring speed, heating and refrigerating capacity, and an automatic control of an accompanying digital display of various parameters. The automatic control system mainly includes a cabinet, a touch screen display, an auxiliary circuit breaker, a contactor, an overload protector and so on. The automatic control system is provided with a graphical human-machine interface, which can realize an automatic control of the operation of the whole device (including the control of quantitative fluid transferring, stirring speed, heating and refrigerating capacity, and digital display of various parameters), and it includes one cabinet, a touch screen display, an auxiliary circuit breaker, a contactor, an overload protector and so on.

In some embodiments, the non-aqueous solvent storage tank is made of an environment-friendly and corrosion-resistant material and has a magnetic float level meter; the non-aqueous solvent storage tank has an outer wall that has been reinforced with annular steel belts, and is provided with an automatic feeding port at its upper end and a discharging port at its lower end. The water storage tank is made of an environment-friendly and corrosion-resistant material and has a magnetic float level meter; the water storage tank has an outer wall that has been reinforced with annular steel belts, and is provided with an automatic feeding port at its upper end and a discharging port at its lower end.

According to the needs of actual production scale and the consideration of refrigeration efficiency, in some embodiments, the metal salt preparation kettle, the precipitant preparation kettle, the primary reaction kettle and the secondary reaction kettle each has a capacity of 0.5 $m^3$-100 $m^3$, and the non-aqueous solvent storage tank and the water storage tank each has a capacity of 10 $m^3$-2000 $m^3$.

Both the non-aqueous solvent storage tank and the water storage tank are provided with one automatic feeding port at their upper end for the supplement of the non-aqueous solvent and water, and two discharging ports at their lower end, which are connected with the metal salt preparation kettle and the precipitant preparation kettle by pipelines respectively, wherein each pipeline is provided with a liquid transferring pump at its middle for transferring a quantitative non-aqueous solvent and water, and the transferring is controlled by the automatic control system.

In some embodiments, both the metal salt preparation kettle and the precipitant preparation kettle are provided with a manual feeding port at their upper end for feeding a metal salt and a precipitant respectively during the production, and two automatic feeding ports, which are connected with the non-aqueous solvent storage tank and water storage tank by pipelines respectively, for the charging of a quantitative non-aqueous solvent and water, and one discharging port at their lower end, which is connected with the primary reaction kettle and the secondary reaction kettle by pipelines respectively, wherein each pipeline is provided with a liquid transferring pump at its middle for transferring material, and the transferring is controlled by the automatic control system.

In some embodiments, the primary reaction kettle is provided with two automatic feeding ports at its upper end and a discharging port at its lower end, wherein the automatic feeding ports are connected with the metal salt preparation kettle and the secondary reaction kettle by pipelines respectively, for transferring the materials before the reaction and the precipitant during the reaction, and the discharging port is used for discharging products after the reaction.

In some embodiments, the secondary reaction kettle is provided with one automatic feeding port at its upper end and one discharging port at its lower end, wherein the automatic feeding port is connected with the precipitant preparation kettle by a pipeline, for transferring a precipitant-containing solution, and the discharging port is connected with the automatic feeding port of the primary reaction kettle by a pipeline, wherein the pipeline is equipped with a liquid transferring pump at its middle for constantly transferring the precipitant during the production, and the transferring is controlled by the automatic control system.

In some embodiments, the circulating refrigeration system is connected with the primary reaction kettle and the secondary reaction kettle by pipelines, for the refrigeration control of them by a circulating coolant.

In some embodiments, the automatic control system is configured to control the whole system, display the liquid level of the non-aqueous solvent storage tank and the water storage tank in real time, control the transfer of the quantitative non-aqueous solvent and water, and display and control the liquid levels, temperatures, stirring speeds, liquid charging and discharging in the metal salt preparation kettle, the precipitant preparation kettle, the primary reaction kettle and the secondary reaction kettle.

Based on the above device for continuous industrial production by low-temperature coprecipitation, the present disclosure provides a method for producing catalysts by using the device, mainly comprising the following steps:

step 1: with the automatic control system, transferring a quantitative non-aqueous solvent from the non-aqueous solvent storage tank and water from the water storage tank to the metal salt preparation kettle, adding a quantitative metal salt to the metal salt preparation kettle, heating and stirring the mixture for fully dissolving the metal salt;

step 2: with the automatic control system, transferring a quantitative non-aqueous solvent from the non-aqueous solvent storage tank and water from the water storage tank to the precipitant preparation kettle, adding a quantitative precipitant to the precipitant preparation kettle, heating and stirring the mixture for fully dissolving the precipitant;

step 3: with the automatic control system, transferring the mixed solution in the metal salt preparation kettle to the primary reaction kettle and transferring the mixed solution in the precipitant preparation kettle to the secondary reaction kettle; refrigerating the primary reaction kettle and the secondary reaction kettle by the circulating refrigeration system which is controlled by the automatic control system, and controlling the primary reaction kettle and the secondary reaction kettle in a stirring state; under the condition that the primary reaction kettle and the secondary reaction kettle are refrigerated to the synthesis temperature, transferring the precipitant in the secondary reaction kettle to the primary reaction kettle at a constant speed by a liquid constant-flow pump that is controlled by the automatic control system;

after the synthesis, discharging a material from the discharging port at the lower end of the primary reaction kettle;

step 4: preparing the raw materials for the next batch in the metal salt preparation kettle and the precipitant preparation kettle according to steps 1 and 2 during the synthesis; after the synthesis is completed and the material in the primary reaction kettle is discharged, transferring the raw materials in the metal salt preparation kettle and the precipitant preparation kettle to the primary reaction kettle and the secondary reaction kettle respectively with the automatic control system to perform a synthesis of the next batch.

In some embodiments, in step 1, the ratio of the non-aqueous solvent to water could be arbitrarily adjusted according to the synthesis requirements, and the metal salt could be any metal salt that is soluble in the non-aqueous solvent and water according to catalyst synthesis requirements. In some embodiments, the metal salt is a sulfate.

In some embodiments, in step 2, the ratio of the non-aqueous solvent to water could be arbitrarily adjusted according to the synthesis requirements, and the precipitant could be any alkali or salt that is soluble in the non-aqueous solvent and water and could react with the metal salt in step 1 to obtain a precipitate according to catalyst synthesis requirements.

The production device and the method using the same provided by the present disclosure make it possible to realize the continuous industrial production of catalysts by a coprecipitation reaction at a constant low temperature (ranging from −20° C. to 0° C.). Compared to those in the prior art, the device and the method using the same according to the present disclosure have the characteristics and advantages in terms of the device design and using process mainly in the following three aspects:

1) The device is equipped with an independent metal salt preparation kettle and precipitant preparation kettle having heating and stirring functions, which makes it possible to realize rapid dissolutions of metal salt and precipitant respectively.

2) The device is equipped with a secondary reaction kettle having refrigerating and stirring functions, which can pre-refrigerate the precipitant before the low-temperature coprecipitation reaction. With the low-temperature precipitant, it is possible to effectively offset the precipitation reaction heat and the heat brought by stirring in the primary reaction kettle, and improve the refrigeration efficiency of the primary reaction kettle during the low-temperature coprecipitation reaction.

3) The preparation of the raw materials for the next batch could be performed in the independent metal salt preparation kettle and the precipitant preparation kettle during the period when the low-temperature coprecipitation synthesis is carried out in the primary reaction kettle and the secondary reaction kettle; after the low-temperature synthesis is completed and the material in the primary reaction kettle is discharged, the prepared raw materials for the next batch could be transferred to the primary reaction kettle and the secondary reaction kettle respectively to realize the continuous operation of the low-temperature coprecipitation synthesis.

BRIEF DESCRIPTION OF THE DRAWINGS

FIG. 1 shows the schematic structure of the device for continuous industrial production of catalysts based on low-temperature coprecipitation according to an embodiment of the present disclosure.

DETAILED DESCRIPTION

In order to explain the technical characteristics of the device according to the present disclosure and its use in an actual catalyst production better, the present disclosure will be further illustrated with reference to the attached drawing and embodiments. The specific embodiments are only used to explain the present disclosure, and are not used to limit the present disclosure.

Based on the device for the continuous production of catalysts by low-temperature coprecipitation according to the present disclosure, the following exemplifies the main equipment and auxiliary equipments of a device for producing metal oxide catalyst with an annual output of 10 tons. The equipment parameters are as follows:

A primary reaction kettle with a capacity of 2000 L is made of 304 stainless steel, has an inner liner with a thickness of 8 mm, a heat-preservation jacket with a thickness of 6 mm, wherein the outer part of the jacket is covered with a stainless steel skin with a mirror polished external surface, and the inner part thereof is filled with a polyurethane for heat preservation.

A secondary reaction kettle with a capacity of 1500 L is made of 304 stainless steel, has an inner liner with a thickness of 8 mm, a heat-preservation jacket with a thickness of 6 mm, wherein the outer part of the jacket is covered with a stainless steel skin with a mirror polished external surface and the inner part thereof is filled with a polyurethane for heat preservation.

A metal salt preparation kettle with a capacity of 500 L is made of 304 stainless steel, has an inner liner with a thickness of 6 mm and a diameter of 900 mm, and a heat-preservation jacket, wherein the outer part of the jacket is covered with a stainless steel skin that has a mirror polished external surface, and the inner part thereof is filled with a heat-preservation cotton.

A precipitant preparation kettle with a capacity of 1500 L is made of 304 stainless steel, has an inner liner with a thickness of 6 mm and a diameter of 1200 mm, and a heat-preservation jacket, wherein the outer part of the jacket is covered with a stainless steel skin that has a mirror polished external surface, and the inner part thereof is filled with a heat-preservation cotton.

A liquid storage tank with a capacity of 10 m$^3$ is made of an environment-friendly and corrosion-resistant material, and provided with a magnetic float level meter, and has an outer barrel wall that is reinforced with annular steel belts.

A circulating refrigeration system has a refrigerating capacity of the unit of 160 kW, could reach a lowest temperature of −20° C., has a liquid crystal display touch screen, is controlled by a PLC and provided with two low-temperature coolant circulating pumps and a stainless steel liquid storage tank with a capacity of 2 m$^3$, and has an input power of 60 kW.

A plate and frame filter press has a filter area of 75 m$^2$, a filter chamber with a capacity of 1133 L, a PLC automatic pull plate, a filter temperature of 0-80° C., a filter pressure of 0.8 MPa, a host computer power of 2.2 kW, and a pull plate motor with a power of 0.37 kW.

A vacuum drying oven has a temperature ranging from ambient temperature to 60° C., a heating power of 18 kW, comprises a drying plate with a dimension (mm) of 640×460×45, and has an overall dimension (mm) of 1200×1400×1280.

A rotary furnace is continuously adjustable up to 500° C. and automatically controlled, with a speed of 0-4 r/min, a inclination of 0-10°, a volume of 84 L, a voltage of 220 V, and a power of 16 kW.

An automatic control system is provided with a graphical human-machine interface, which can control the whole system, and includes one cabinet, a 10 inches touch screen display and an auxiliary circuit breaker, a contactor, an overload protector and so on.

The technical process for producing metal oxides by low-temperature coprecipitation with the above device mainly comprises: the dissolution and coprecipitation of a metal salt and a precipitant in the synthetic mother liquid, a solid-liquid separation of products, a vacuum drying of the filter cake, a crushing and a calcination of solid products after drying.

Specific production examples for producing manganese-based metal oxide based on low-temperature coprecipitation are as follows:

Production Example 1 (Industrial Synthesis of Iron-Manganese Composite Oxides)

Step 1: 288 L of glycerol from the non-aqueous solvent storage tank and 72 L of water from the water storage tank were transferred to the metal salt preparation kettle with the automatic control system, and 200 mol of $FeSO_4 \cdot 4H_2O$ and 400 mol of $MnSO_4 \cdot 4H_2O$ were then added thereto through a manual feeding port of the metal salt preparation kettle. The metal salt preparation kettle was heated to 70° C. with a stirring at a speed of 80 r/min to fully dissolve the iron salt and manganese salt in the mixed solution of glycerol and water.

Step 2: 480 L of glycerol from the non-aqueous solvent storage tank and 720 L of water from the water storage tank were transferred to the precipitant preparation kettle with the automatic control system, and 1200 mol of $K_2CO_3$ was then added thereto through a manual feeding port of the precipitant preparation kettle. The precipitant preparation kettle was heated to 70° C. with a stirring at a speed of 80 r/min to fully dissolve $K_2CO_3$ in the mixed solution of glycerol and water.

Step 3: The dissolved metal salt mixed solution was transferred from the metal salt preparation kettle to the primary reaction kettle, and the precipitant mixed solution was transferred from the precipitant preparation kettle to the secondary reaction kettle with the automatic control system. The resulting mixture in the primary reaction kettle and the secondary reaction kettle were stirred at a speed of 80 r/min, and both the primary reaction kettle and the secondary reaction kettle were refrigerated to −5° C. by the circulating refrigeration system, and then the temperatures thereof were stabilized for 6 h.

Step 4: Under the condition that the temperatures of the primary reaction kettle and the secondary reaction kettle were stabilized at −5° C., the precipitant in the secondary reaction kettle was transferred to the primary reaction kettle at a constant speed of 200 L/h. After the precipitant was transferred completely, the stirring in the primary reaction kettle was continued at a speed of 80 r/min for another 2 h, and then a material was discharged through a discharging port at the lower end of the kettle.

Step 5: After step 4, steps 3 and 4 were circularly carried out to realize the continuous operation of low-temperature coprecipitation, with the proviso that steps 1 and 2 were carried out at the same time as steps 3 and 4.

Step 6: The material discharged from the primary reaction kettle was subjected to a solid-liquid separation by a plate and frame filter press, and the obtained filter cake was dried in a vacuum drying oven at a constant temperature of 60° C.

Step 7: The dried filter cake was crushed, and calcined at 400° C. for 4 h in a rotary furnace in air atmosphere with a speed of 4 r/min and an inclination of 5°, obtaining a final metal oxide product.

Production Example 2 (Industrial Synthesis of Cobalt-Manganese Composite Oxides)

Step 1: 288 L of glycerol from the non-aqueous solvent storage tank and 72 L of water from the water storage tank were transferred to the metal salt preparation kettle with the automatic control system, and 200 mol of $CoSO_4 \cdot 7H_2O$ and 400 mol of $MnSO_4 \cdot 4H_2O$ were then added thereto through a manual feeding port of the metal salt preparation kettle. The metal salt preparation kettle was heated to 70° C. with a stirring at a speed of 80 r/min to fully dissolve the cobalt salt and manganese salt in the mixed solution of glycerol and water.

Step 2: 480 L of glycerol from the non-aqueous solvent storage tank and 720 L of water from the water storage tank were transferred to the precipitant preparation kettle with the automatic control system, and 1200 mol of $K_2CO_3$ was then added thereto through a manual feeding port of the precipitant preparation kettle. The precipitant preparation kettle was heated to 70° C. with a stirring at a speed of 80 r/min to fully dissolve $K_2CO_3$ in the mixed solution of glycerol and water.

Step 3: The dissolved metal salt mixed solution was transferred from the metal salt preparation kettle to the primary reaction kettle and the precipitant mixed solution was transferred from the precipitant preparation kettle to the secondary reaction kettle with the automatic control system. The resulting mixture in the primary reaction kettle and the secondary reaction kettle were stirred at a speed of 80 r/min, and both the primary reaction kettle and the secondary reaction kettle were refrigerated to −5° C. by the circulating refrigeration system, and then the temperatures thereof were stabilized for 6 h.

Step 4: Under the condition that the temperatures of the primary reaction kettle and the secondary reaction kettle were stabilized at −5° C., the precipitant in the secondary reaction kettle was transferred to the primary reaction kettle at a constant speed of 200 L/h. After the precipitant was transferred completely, the stirring in the primary reaction kettle was continued at a speed of 80 r/min for another 2 h, and then a material was discharged through a discharging port at the lower end of the kettle.

Step 5: After step 4, steps 3 and 4 were circularly carried out to realize the continuous operation of low-temperature coprecipitation, with the proviso that steps 1 and 2 were carried out at the same time as steps 3 and 4.

Step 6: The material discharged from the primary reaction kettle was subjected to a solid-liquid separation with a plate and frame filter press, and the obtained filter cake was dried in a vacuum drying oven at a constant temperature of 60° C.

Step 7: The dried filter cake was crushed, and calcined at 400° C. for 4 h in a rotary furnace in air atmosphere with a speed of 4 r/min and an inclination of 5°, obtaining a final metal oxide product.

Production Example 3 (Industrial Synthesis of Nickel-Manganese Composite Oxides)

Step 1: 288 L of glycerol from the non-aqueous solvent storage tank and 72 L of water from the water storage tank were transferred to the metal salt preparation kettle with the automatic control system, and 200 mol of $NiSO_4.7H_2O$ and 400 mol of $MnSO_4.4H_2O$ were then added thereto through a manual feeding port of the metal salt preparation kettle. The metal salt preparation kettle was heated to 70° C. with a stirring at a speed of 80 r/min to fully dissolve the nickel salt and manganese salt in the mixed solution of glycerol and water.

Step 2: 480 L of glycerol from the non-aqueous solvent storage tank and 720 L of water from the water storage tank were transferred to the precipitant preparation kettle with the automatic control system, and 1200 mol of $K_2CO_3$ was then added thereto through a manual feeding port of the precipitant preparation kettle. The precipitant preparation kettle was heated to 70° C. with a stirring at a speed of 80 r/min to fully dissolve $K_2CO_3$ in the mixed solution of glycerol and water.

Step 3: The dissolved metal salt mixed solution was transferred from the metal salt preparation kettle to the primary reaction kettle and the precipitant mixed solution was transferred from the precipitant preparation kettle to the secondary reaction kettle with the automatic control system. The resulting mixture in both the primary reaction kettle and the secondary reaction kettle were stirred at a speed of 80 r/min, and both the primary reaction kettle and the secondary reaction kettle were refrigerated to −5° C. by the circulating refrigeration system, and then the temperatures thereof were stabilized for 6 h.

Step 4: Under the condition that the temperatures of the primary reaction kettle and the secondary reaction kettle were stabilized at −5° C., the precipitant in the secondary reaction kettle was transferred to the primary reaction kettle at a constant speed of 200 L/h. After the precipitant was transferred completely, the stirring in the primary reaction kettle was continued at a speed of 80 r/min for another 2 h, and then a material was discharged through the discharging port under the kettle.

Step 5: After step 4, steps 3 and 4 were circularly carried out to realize the continuous operation of low-temperature coprecipitation, with the proviso that steps 1 and 2 were carried out at the same time as steps 3 and 4.

Step 6: The material discharged from the primary reaction kettle was subjected to a solid-liquid separation by a plate and frame filter press, and the obtained filter cake was dried in a vacuum drying oven at a constant temperature of 60° C.

Step 7: The dried filter cake was crushed, and calcined at 400° C. for 4 h in a rotary furnace in air atmosphere with a speed of 4 r/min and an inclination of 5°, obtaining a final metal oxide product.

The manganese-based composite metal oxide prepared by the device and method provided by the present disclosure has been successfully used in the fields of low-temperature denitrification, Fischer-Tropsch synthesis, fuel cells and the like, and produced good effects in these fields. It can be easily understood by those skilled in the art that the above description is only the preferred embodiments of the present disclosure, and is not intended to limit the present disclosure. Any modifications, equivalent substitutions and improvements made within the spirit and principles of the present disclosure should be included in the protection scope of the present disclosure.

What is claimed is:

1. A device for continuously producing catalysts based on low-temperature coprecipitation, comprising:
   a metal salt preparation kettle, a primary reaction kettle with a discharge port at a lower end of the primary reaction kettle, a secondary reaction kettle, a precipitant preparation kettle, a circulating refrigeration system, an automatic control system, a non-aqueous solvent storage tank and a water storage tank, wherein:
   the automatic control system is configured to control transfer of a quantitative non-aqueous solvent from the non-aqueous solvent storage tank and quantitative water from the water storage tank to the metal salt preparation kettle respectively, and to control the metal salt preparation kettle in a heating and stirring state after adding a quantitative metal salt to the metal salt preparation kettle;
   the automatic control system is configured to control transfer of a quantitative non-aqueous solvent from the non-aqueous solvent storage tank and quantitative water from the water storage tank to the precipitant preparation kettle respectively, and to control the precipitant preparation kettle in a heating and stirring state after adding a quantitative precipitant to the precipitant preparation kettle;
   the automatic control system is configured to control transfer of a mixed solution in the metal salt preparation kettle to the primary reaction kettle and a mixed solution in the precipitant preparation kettle to the secondary reaction kettle, to control the circulating refrigeration system to refrigerate the primary reaction kettle and the secondary reaction kettle, and to control the primary reaction kettle and the secondary reaction kettle in a stirring state; and
   under the condition that temperatures of the primary reaction kettle and the secondary reaction kettle are reduced to the synthesis temperature, the automatic control system is configured to control addition of a precipitant-containing mixed solution in the secondary reaction kettle into the primary reaction kettle at a constant speed, and after a synthesis, a material is discharged from the discharge port at the lower end of the primary reaction kettle.

2. The device as claimed in claim 1, wherein the metal salt preparation kettle is made of stainless steel, with a heat-preservation jacket, wherein an outer part of the jacket is covered with a stainless steel skin and an inner part thereof is filled with a heat-preservation cotton; the metal salt preparation kettle has a heating function and a stirring function; the metal salt preparation kettle is provided with a manual feeding port and an automatic feeding port at an upper end, and a discharging port at a lower end;
   the primary reaction kettle is made of stainless steel, with a heat-preservation jacket, wherein an outer part of the jacket is covered with a stainless steel skin and an inner part thereof is filled with a polyurethane for heat preservation; the primary reaction kettle has a refrigerating function and a stirring function; the primary reaction kettle is provided with an automatic feeding port for liquid charging at an upper end, and a discharging port at a lower end;
   the secondary reaction kettle is made of stainless steel, with a heat-preservation jacket, wherein an outer part of the jacket is covered with a stainless steel skin and an inner part thereof is filled with a polyurethane for heat preservation; the secondary reaction kettle has a refrigerating function and a stirring function; the secondary reaction kettle is provided with an automatic feeding port for liquid charging at an upper end, and a discharging port for liquid discharging at a lower end; and
   the precipitant preparation kettle is made of stainless steel, with a heat-preservation jacket, wherein an outer part of the jacket is covered with a stainless steel skin and an inner part thereof is filled with a heat-preservation cotton; the precipitant preparation kettle has a heating function and a stirring function; the precipitant preparation kettle is provided with a manual feeding port and an automatic feeding port at an upper end, and a discharging port at a lower end.

3. The device as claimed in claim 1, wherein the circulating refrigeration system is provided with a liquid crystal display touch screen, controlled by a PLC, and equipped with a plurality of low-temperature coolant circulating pumps and stainless-steel liquid storage tanks for storing the coolant specialized for each circulating pump.

4. The device as claimed in claim 1, wherein the automatic control system is provided with a graphical human-machine interface, which can realize an automatic control of the operation of the whole device, including an automatic control of buttons for controlling quantitative fluid transferring, stirring speed, heating and refrigerating capacity, and an automatic control of an accompanying digital display of various parameters; the automatic control system comprises a cabinet, a touch screen display, an auxiliary circuit breaker, a contactor and an overload protector.

5. The device as claimed in claim 1, wherein both the non-aqueous solvent storage tank and the water storage tank are made of an environment-friendly and corrosion-resistant material and have a magnetic float level meter; they have an outer wall that has been reinforced with annular steel belts, and are provided with an automatic feeding port at their upper end and a discharging port at their lower end.

* * * * *